(12) United States Patent
Klein et al.

(10) Patent No.: US 10,526,804 B2
(45) Date of Patent: Jan. 7, 2020

(54) DRIVABLE WORKING MACHINE AND METHOD FOR OPERATING SAME

(71) Applicant: Putzmeister Engineering GmbH, Aichtal (DE)

(72) Inventors: Christiane Klein, Aichtal (DE); Tobias Huth, Dresden (DE); Ansgar Müller, Stuttgart (DE)

(73) Assignee: PUTZMEISTER ENGINEERING GMBH, Aichtal (DE)

( * ) Notice: Subject to any disclaimer, the term of this patent is extended or adjusted under 35 U.S.C. 154(b) by 264 days.

(21) Appl. No.: 15/796,554

(22) Filed: Oct. 27, 2017

(65) Prior Publication Data

US 2018/0051475 A1 Feb. 22, 2018

Related U.S. Application Data

(63) Continuation of application No. PCT/EP2016/059484, filed on Apr. 28, 2016.

(30) Foreign Application Priority Data

Apr. 30, 2015 (DE) .................. 10 2015 208 071

(51) Int. Cl.
*B60S 9/10* (2006.01)
*E04G 21/04* (2006.01)
(Continued)

(52) U.S. Cl.
CPC ............ *E04G 21/0436* (2013.01); *B60S 9/10* (2013.01); *B66C 23/80* (2013.01); *E04G 21/0445* (2013.01); *E02F 9/085* (2013.01)

(58) Field of Classification Search
CPC ................................ E04G 21/0436; B60S 9/10
See application file for complete search history.

(56) References Cited

U.S. PATENT DOCUMENTS

2005/0271522 A1   12/2005   Leibbrand et al.
2011/0112728 A1    5/2011   Stacy, II
(Continued)

FOREIGN PATENT DOCUMENTS

CN   101457589 A   6/2009
DE   101 43 716 A1  3/2003
(Continued)

OTHER PUBLICATIONS

English translation of the International Preliminary Report on Patentability, PCT/EP2016/059484, dated Jun. 22, 2017.

*Primary Examiner* — Jess Whittington
(74) *Attorney, Agent, or Firm* — Bose McKinney & Evans LLP

(57) ABSTRACT

This disclosure relates to a drivable working machine, including a vehicle, a concrete placing boom that can be rotated on a vehicle-fixed carrying structure by means of a slewing gear, and a plurality of supporting legs arranged on the carrying structure for supporting the carrying structure in a working position. A compensation device is provided to compensate a rotational deflection of the carrying structure from the working position. The compensation device has a sensing unit for sensing the rotational deflection and acts on at least one supporting leg by means of an associated actuator to reduce the rotational deflection.

24 Claims, 2 Drawing Sheets

(51) Int. Cl.
*B66C 23/80* (2006.01)
*E02F 9/08* (2006.01)

(56) References Cited

U.S. PATENT DOCUMENTS

| | | | | |
|---|---|---|---|---|
| 2015/0369213 | A1* | 12/2015 | Jakobsson | F03D 7/0204 |
| | | | | 416/153 |
| 2016/0223313 | A1* | 8/2016 | Vierkotten | B66C 13/46 |
| 2016/0290429 | A1* | 10/2016 | Khan | F16F 15/023 |
| 2018/0372071 | A1* | 12/2018 | Muller | F03D 7/0204 |

FOREIGN PATENT DOCUMENTS

| | | |
|---|---|---|
| DE | 102 46 447 A1 | 4/2004 |
| DE | 103 20 382 A1 | 12/2004 |
| DE | 10 2013 014 626 A1 | 3/2015 |
| EP | 1 847 505 A2 | 10/2007 |
| JP | H07-117987 A | 5/1995 |

\* cited by examiner

DRIVABLE WORKING MACHINE AND METHOD FOR OPERATING SAME

RELATED APPLICATIONS

This application is a continuation of PCT/EP2016/059484, filed Apr. 28, 2016, which claims priority to DE 10 2015 208 071.4, filed Apr. 30, 2015, the entire disclosures of which are hereby incorporated herein by reference in their entireties.

BACKGROUND

This disclosure relates to a drivable working machine, particularly a truck-mounted concrete pump, comprising a vehicle, a concrete placing boom, which can be rotated on a vehicle-fixed carrying structure by means of a slewing gear, and a plurality of supporting legs arranged on the carrying structure for supporting the carrying structure in a working position. This disclosure further relates to a method for the low-oscillation operation of such a drivable working machine.

In the case of drivable concrete pumps of the type described in DE 102 46 447 A1, the carrying structure is placed onto the undercarriage of a truck chassis. The boom pedestal or slewing gear of the carrying structure forms the interface between the placing boom and the supporting legs. The torque load caused by the placing boom is distributed among the supporting legs via the boom pedestal and is applied to the base surface. In the case of drivable concrete pumps, a carrying structure that is equipped with two telescoping supporting legs in the front and two supporting legs that can be swung out in the rear is especially preferred. Because components are increasingly of light-weight design, oscillations are an ever greater problem. In addition to the boom motions, disturbance torques are caused by the motions of the conveying pump and the redirecting of the concrete flow. A disadvantage here is that the rear structure protrudes far rearward with the feed hopper. In the working position, the hydraulic cylinders of the working legs are generally extended on both sides. Previously, the hydraulic cylinders were first locked by means of a so-called alternating operation valve before the hydraulic supply was switched over to the placing boom. In order to avoid tipping, the vehicle wheels should not have ground contact but rather should be lifted off by means of the supporting legs. However, the yaw stiffness is lowest in this arrangement. Yaw motions are promoted by the play in the supporting legs and the long flexural structure of the supporting legs, which acts as a torsion beam.

SUMMARY

This disclosure teaches improving the working machines known in the prior art and the mode of operation of said working machines and teaches measures for minimizing the motion of the carrying structure in the working position.

This disclosure proceeds from the idea of reducing undesired deflections by means of control measures. Accordingly, a compensation device designed to compensate rotational deflection of the carrying structure from the working position is proposed according to this disclosure. Said compensation device (also referred to as "compensator") has a sensing unit for sensing the rotational deflection and acts on at least one supporting leg by means of an associated actuator in order to reduce the rotational deflection. A high yaw stiffness can thereby be achieved even in the case of light-weight design. This can be realized with minimal hardware expenditure by utilizing existing components and thus largely without affecting the weight.

Advantageously, the sensing unit has a motion sensor for sensing a rotational deflection, particularly a yaw vibration, so that accurate knowledge of the dynamic behavior can be obtained.

To enable an improved analysis of the time behavior, it is advantageous if the sensing unit has an acceleration sensor, preferably arranged on the rear end of the vehicle, advantageously in the region of a feed hopper.

The influence of boom motions on undesired rotational deflections of the carrying structure can be taken into account with respect to control in that the sensing unit has a sensing device (sensor) for directly or indirectly sensing a torque applied to the carrying structure when the boom is rotated.

In this context, it is especially advantageous if the sensing unit has a deformation sensor, particularly a strain gauge, arranged in the region of the slewing gear.

For indirect utilization of influencing parameters, it is advantageous if the sensing unit has a processor for deriving a controlled variable from an operating parameter of the boom and/or of a conveying pump.

In order to sense the effective state of the actuators, it is advantageous if the sensing unit has a supporting force sensor for sensing a supporting force acting in the longitudinal direction of a hydraulic supporting cylinder of the supporting leg.

An embodiment that is especially advantageous for reducing dead times provides that the compensation device has a controller having a feed-forward control system, wherein the feed-forward control system senses a disturbance variable resulting from the actuation of the concrete placing boom and/or the conveying pump and leads said disturbance variable to the controller input.

In order to use an existing structure for the closed-loop control system or the open-loop control system, it is advantageous if the actuator has a hydraulic cylinder arranged between the carrying structure and the supporting leg, wherein the hydraulic cylinder is designed to pivot the supporting leg between a driving position lying against the carrying structure and a supporting position protruding from the carrying structure.

A further improvement provides that the sensing unit comprises at least one pressure sensor connected to the hydraulic cylinder, and that the actuator has a directional control valve connected to the hydraulic cylinder on the crown side and on the rod side.

It is also conceivable that the sensing unit has a sensing apparatus that senses the cylinder length of the hydraulic cylinder. On the basis of this, length control can be provided for oscillation compensation, wherein it is then advantageous to convert the torques to be applied into a displacement signal.

In one exemplary embodiment as a truck-mounted concrete pump, a concrete conveying pump connected between a feed hopper and the concrete placing boom and preferably designed as a two-cylinder piston pump is provided. In this case, an amplitude reduction of undesired feed hopper vibrations can be achieved by means of the compensation device.

To reduce the risk of tipping, it is advantageous if the wheels of the vehicle are lifted from the ground in the working position.

This disclosure teaches a method in which a rotational deflection of the carrying structure from the working position is compensated by means of a compensation device, wherein the compensation device acts on at least one supporting leg by means of an actuator.

For control intervention, it is advantageous if a rotational deflection of the carrying structure is detected by means of a sensing unit of the compensation device and if, from the disturbance variable generated therefrom, a counter-torque on the at least one supporting leg is produced by means of the actuator in order to reduce the rotational deflection.

In order to improve the control quality, it is especially advantageous if the compensation device is formed by a controller having a feed-forward control system, wherein the feed-forward control system senses a disturbance variable resulting from the actuation of the concrete placing boom and/or the conveying pump and leads said disturbance variable to the controller input.

In order to integrate the existing supporting leg structure with respect to control, it is advantageous if a hydraulic cylinder designed to horizontally pivot a supporting leg between a driving position and a supporting position is used as the actuator.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

In this disclosure, terms such as "horizontal" and "vertical" are generally used to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning generally positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "support leg," "sensor," "actuator," to name a few, should be interpreted when appearing in this disclosure and claims to mean "one or more" or "at least one." All other terms used herein should be similarly interpreted unless it is made explicit that a singular interpretation is intended.

Figure 1:
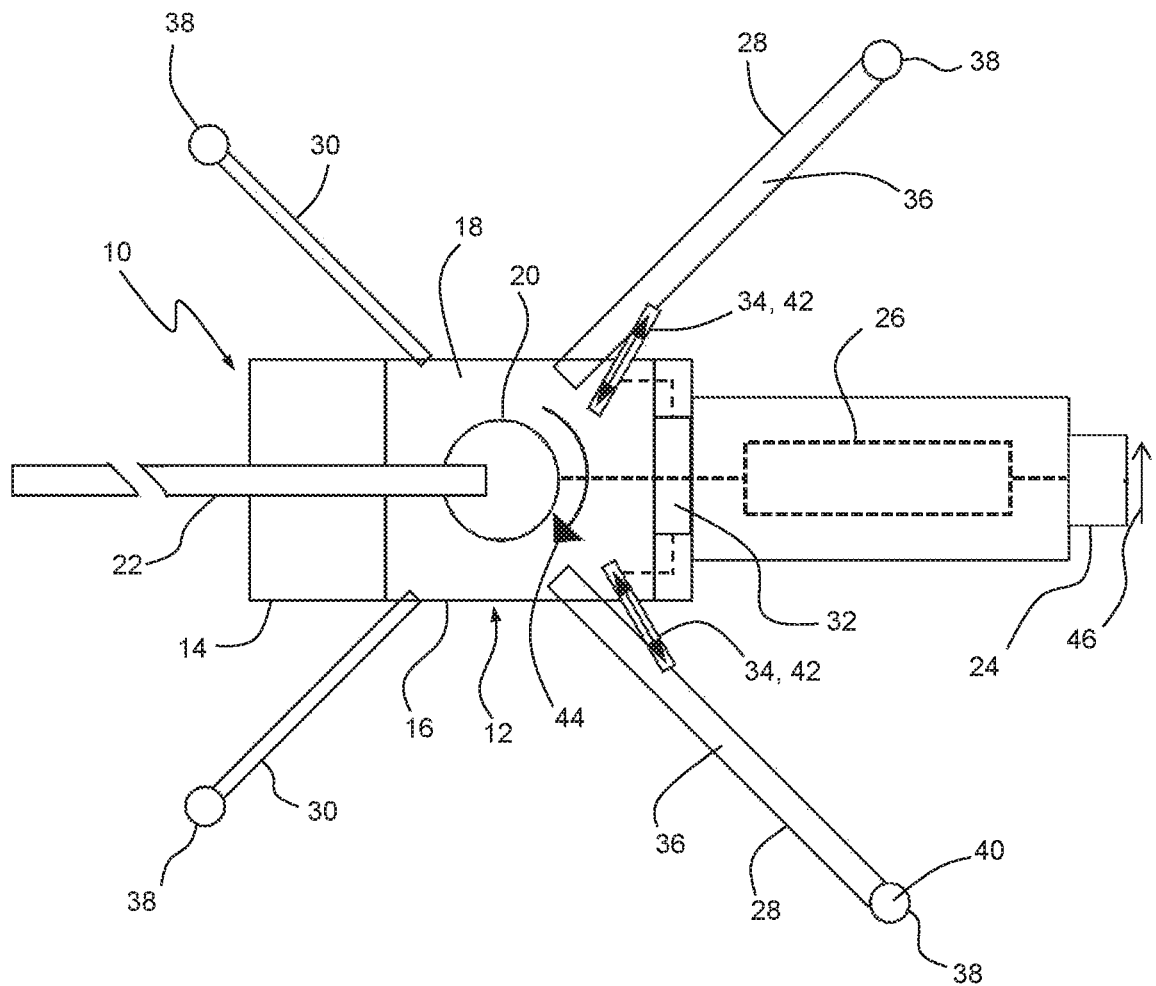
FIG. 1 is a schematically simplified top view of a truck-mounted concrete pump in a working position with supporting legs and concrete placing boom set out.

The truck-mounted concrete pump 10 illustrated in FIG. 1 comprises a transport vehicle 12, having a driver cab 14 and an undercarriage 16, a superstructure frame or a carrying structure 18, a multi-link concrete placing boom 22 that can be rotated about a vertical axis by means of a slewing gear 20, a conveying pump 26, connected between a feed hopper 24 and the concrete placing boom 22 and designed as a two-cylinder piston pump, for conveying liquid concrete, and a plurality of supporting legs 28, 30 for supporting the carrying structure 18 in a working position provided for concreting operation. To enable compensation of an undesired rotational deflection or yaw oscillation of the carrying structure 18 during concreting operation, a compensation device or compensator 32, illustrated only symbolically in FIG. 1, is also provided.

In the supporting configuration shown, the rear supporting legs 28 can be horizontally pivoted as pivoting legs by means of respective hydraulic cylinders 34 between a driving position lying against the carrying structure 18 and a supporting position protruding from the carrying structure 18, while the front supporting legs 30 can be telescoped into the supporting position thereof.

The hydraulic cylinders 34 are articulated to the carrying structure 18 on the crown side and to a horizontal pivoting arm 36 of the supporting legs 28 on the rod side. Thus, the hydraulic cylinders 34 can also be used as an actuator 42 of the compensation device 32 in order to counteract undesired rotational deflections about the vehicle vertical axis.

In the supporting position, supporting feet 38 can be extended vertically downward hydraulically until the vehicle wheels are lifted from the ground. The supporting force Fs can be sensed by means of a force sensor 40.

When the placing boom 22 is rotated, yaw motions of the carrying structure 18 occur, which lead to large deflections at the feed hopper 24 and are generally perceived as unpleasant by machine operators. The flexurally and torsionally elastic supporting legs 28, 30 are a reason for said motions. The torques, which would lead to yawing of the carrying structure 18, can be compensated by targeted application of counter-torques by means of the hydraulic cylinders 34.

To enable this, a sensing device 44 for directly or indirectly sensing a torque $M_{DW}$ applied to the slewing gear 20 during the boom rotation is provided on the slewing unit 20. Alternatively or additionally, a motion sensor 46, particularly an acceleration sensor for sensing a horizontal acceleration ẍ, is arranged on the feed hopper 24.

To directly determine the loading torque $M_{DW}$ on the slewing gear 20, it is necessary to measure deformation and to infer the torque therefrom. Various measurement methods are possible for measuring the deformation as a length change: strain gauges, string elongation sensors, draw wire sensors, piezoelectric elements, inductive displacement sensors, magnetostrictive or interferometric measurements, triangulation, or ultrasound. In the case of the mentioned variants, the measurement chain is calibrated once and then the torque is measured directly.

Furthermore, the torque $M_{DW}$ can be determined indirectly. For this purpose, the hydraulic pressures can be measured at the motor of the slewing unit 20 and the torque $M_{DW}$ can be calculated on the basis of estimates for the influence of the oil temperature, of the holding brake, and of other disturbances.

The loading torque $M_{DW}$ can also be calculated from control commands by means of an electronic processor. The positions of valves, the boom position, and thus the mass moment inertia and design values such as the transmission gear ratio and the displacement volume of the slewing unit motor generally allow the applied torque to be calculated.

For influences that result from the pumping process of the conveying pump 26, reaction processes can be programmed in the compensation device 32 in advance and can then be started at the right time. The necessary information such as the point in time of the pumping pulse, the pump speed, and the diverter-valve speed are specified and/or monitored by control units and therefore can be utilized. Because the disturbance variables (pumping process, boom rotation) are normally already known before the disturbance variables occur, the loads can be calculated in advance and countermeasures can be taken before the loads occur.

Figure 2:
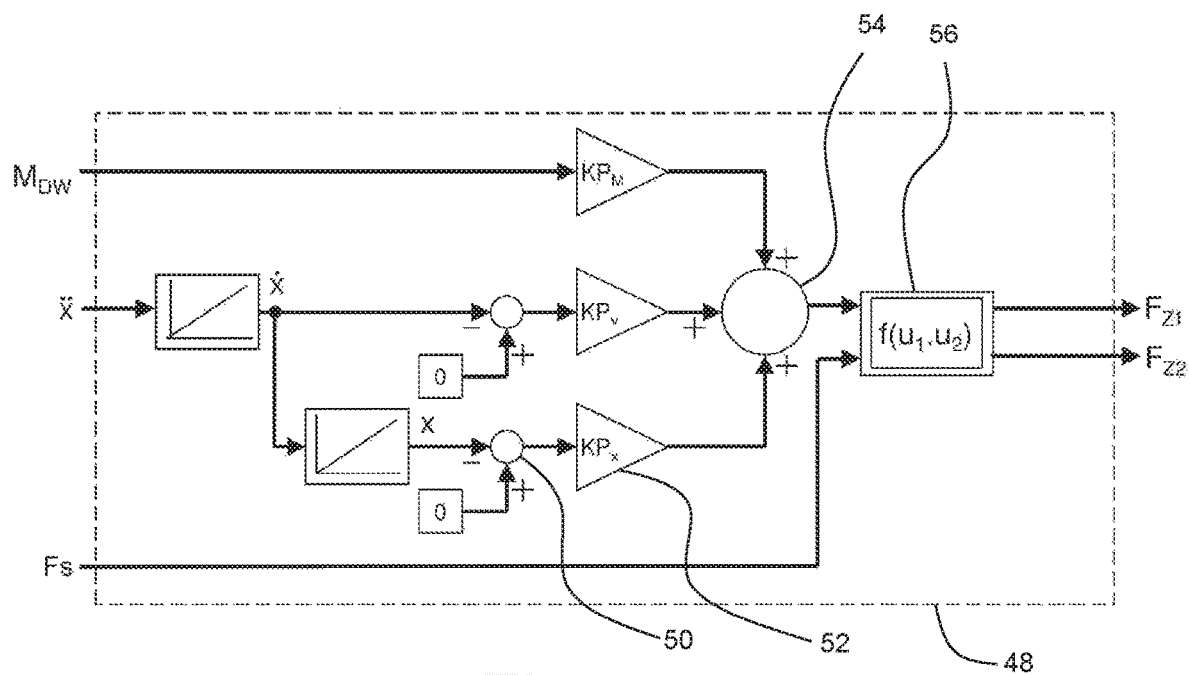
FIG. 2 is a block diagram of a sensing unit of a compensation device for reducing yaw oscillations in the working position.

FIG. 2 illustrates the processing of the load disturbance variables in a sensing unit 48 of the compensation device 32. The velocity $\dot{x}$ and the amplitude x are determined as input variables from the sensed acceleration values $\ddot{x}$. Zero is fed in as a target value at each comparator 50. Arranged downstream thereof are respective amplification elements 52 having proportional amplification for velocity and amplitude. In addition, the torque $M_{DW}$ is likewise proportionally amplified. These input variables are linked at the addition point 54. In a computing element 56, target values or input disturbance variables Fz1 and Fz2 for the counter-forces to be set at the hydraulic cylinders 34 are then determined. The supporting force Fs is also taken into account. Advantageously, force should not be applied by a hydraulic cylinder 34 if the associated supporting foot 38 is lifted from the ground.

The operation of the compensation device 32 is based on the establishment of a torque equilibrium at the carrying structure 18. Regardless of the position of the torques, the sum thereof must be equal to zero so that a static case is present. That is, no motion occurs, and the load is independent of time. If the applied torque is compensated at the carrying structure in this way, the carrying structure stands still. These statements apply to all torques that would lead to a yaw motion.

As an example, the torque $M_{DW}$ applied to the carrying structure 18 as a result of the boom rotation is examined. This torque tends to rotate the carrying structure 18 (yaw motion). The counter-torque is applied by means of the hydraulic cylinders 34. Because there are two cylinders, the counter-torque is split between the cylinders and results as cylinder forces Fz1 and Fz2 multiplied by the associated effective lever arm a. For the sake of simplicity, it is assumed here that both supporting legs 28 transmit force to the ground with the same lever arm and thus both can be used uniformly for compensation. Then the following should apply in equilibrium:

$$(Fz1+Fz2)*a-M_{DW}=0$$

Instead of the hydraulic application of the force for compensation of the stimulating torques, it is also conceivable that electrical (e.g., spindle drive) or magnetic (e.g., controlled electromagnet) generation of force is provided.

Figure 3:
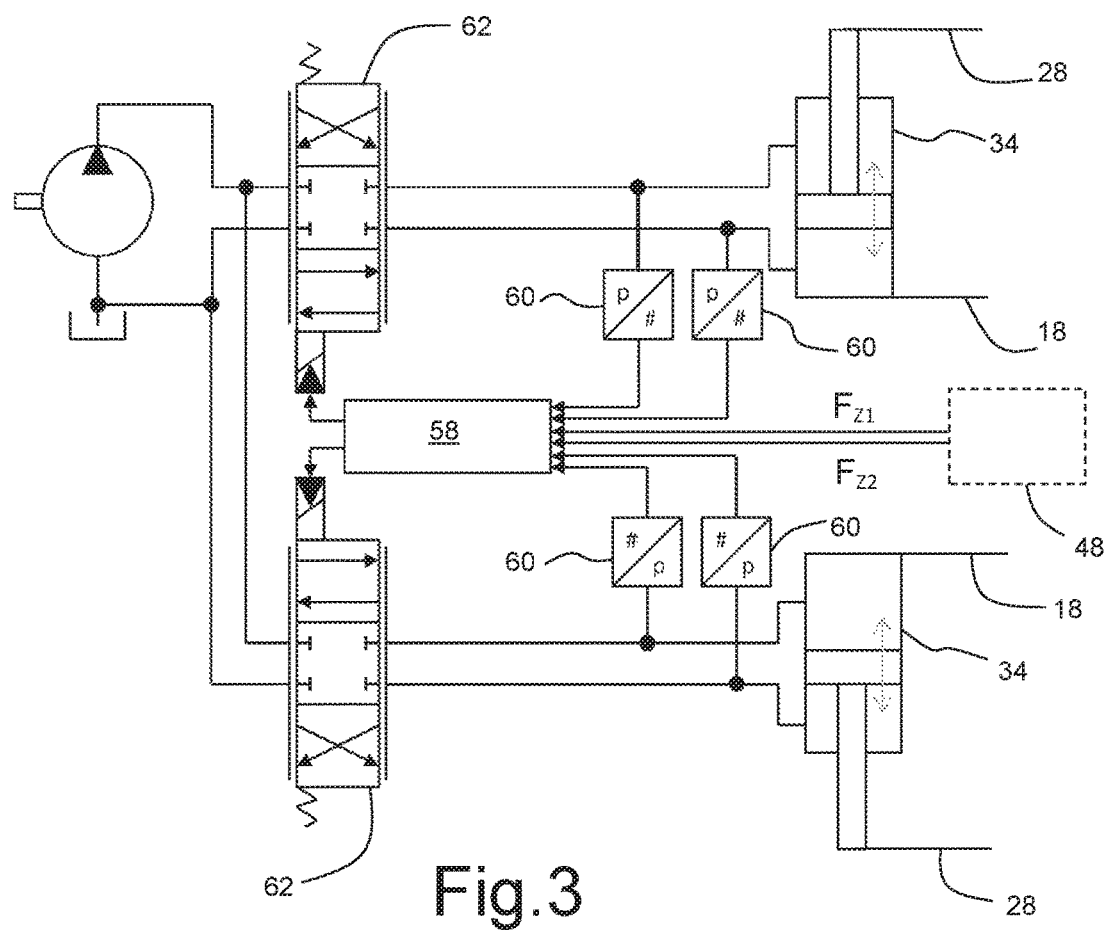
FIG. 3 is a block diagram of a controller of the compensation device.

FIG. 3 shows a control circuit of the compensation device 32 for controlling the hydraulic cylinders 34. Said control circuit comprises a controller 58 having feed-forward control by means of the sensing unit 48. The force that each cylinder 34 applies can be determined from the pressures measured by means of pressure sensors 60 and from the areas of the piston side and of the rod side. This actual value is compared with a target value in the controller 58. In accordance with the control deviation, a directional control valve 62 is actuated, which admits hydraulic oil from a pump 64 into the crown side and the rod side of the hydraulic cylinders 34.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A drivable working machine, comprising: a vehicle; a carrying structure mounted to the vehicle; a boom rotatable on the carrying structure via a slewing gear; a plurality of supporting legs arranged on the carrying structure and configured to support the carrying structure in a working position; a compensator configured to compensate yaw oscillation of the carrying structure in the working position and having a sensing unit configured to sense the yaw oscillation, wherein the sensing unit comprises a sensing device configured to directly or indirectly sense a torque applied to the carrying structure when the boom is rotated, the compensator further configured to act on at least one of the supporting legs via an associated actuator in order to reduce the yaw oscillation.

2. The drivable working machine according to claim 1, wherein the sensing unit has a motion sensor.

3. The drivable working machine according to claim 2, wherein the motion sensor comprises an acceleration sensor or yaw rate sensor for sensing a yaw oscillation.

4. The drivable working machine according to claim 1, wherein the sensing unit comprises an acceleration sensor.

5. The drivable working machine according to claim 4, wherein the acceleration sensor is arranged on the rear end of the vehicle.

6. The drivable working machine according to claim 1, wherein the sensing unit comprises a deformation sensor arranged in a region of the slewing gear.

7. The drivable working machine according to claim 6, wherein the deformation sensor is a strain gauge.

8. The drivable working machine according to claim 1, wherein the sensing unit has a processor configured for deriving a controlled variable from an operating parameter of the boom and/or of a conveying pump arranged on the vehicle.

9. The drivable working machine according to claim 1, wherein the sensing unit has a supporting force sensor for sensing a supporting force acting in the longitudinal direction of a hydraulic supporting cylinder of the supporting leg.

10. The drivable working machine according to claim 1, wherein the compensator has a controller having a feed-forward control system, wherein the feed-forward control system is configured to:
(i) sense a disturbance variable resulting from actuation of the boom and/or a conveying pump arranged on the vehicle;
(ii) sense disturbance variables generated from the sensing unit; and
(iii) feed said disturbance variables to the controller input.

11. The drivable working machine according to claim 1, wherein the actuator has a hydraulic cylinder arranged between the carrying structure and the at least one of the supporting legs, wherein the hydraulic cylinder is configured to pivot the at least one of the supporting legs between a driving position lying against the carrying structure and a supporting position protruding from the carrying structure.

12. The drivable working machine according to claim 11, wherein the sensing unit comprises at least one pressure sensor connected to the hydraulic cylinder.

13. The drivable working machine according to claim 11, wherein the sensing unit has a sensing apparatus that senses the cylinder length of the hydraulic cylinder.

14. The drivable working machine according to claim 11, wherein the actuator comprises a directional control valve connected to the hydraulic cylinder on a crown side and on a rod side.

15. The drivable working machine according to claim 1, further comprising a concrete conveying pump connected between a feed hopper and the boom.

16. The drivable working machine of claim 15, wherein the conveying pump comprises a two-cylinder piston pump.

17. The drivable working machine according to claim 1, wherein wheels of the vehicle are configured to be lifted from the ground in the working position.

18. A drivable working machine, comprising: a vehicle; a carrying structure mounted to the vehicle; a boom rotatable on the carrying structure via a slewing gear; a plurality of supporting legs arranged on the carrying structure and configured to support the carrying structure in a working position; a compensator configured to compensate yaw oscillation of the carrying structure in the working position and having a sensing unit configured to sense the yaw oscillation, the compensator further configured to act on at least one of the supporting legs via an associated actuator in order to reduce the yaw oscillation; wherein the compensator has a controller having a feed-forward control system, wherein the feed-forward control system is configured to: (i) sense a disturbance variable resulting from actuation of the boom and/or a conveying pump arranged on the vehicle; (ii) sense disturbance variables generated from the sensing unit; and (iii) feed said disturbance variables to the controller input.

19. A drivable working machine, comprising: a vehicle; a carrying structure mounted to the vehicle; a boom rotatable on the carrying structure via a slewing gear; a plurality of supporting legs arranged on the carrying structure and configured to support the carrying structure in a working position; a compensator configured to compensate yaw oscillation of the carrying structure in the working position and having a sensing unit configured to sense the yaw oscillation, the compensator further configured to act on at least one of the supporting legs via an associated actuator in order to reduce the yaw oscillation; and wherein the actuator has a hydraulic cylinder arranged between the carrying structure and the at least one of the supporting legs, wherein the hydraulic cylinder is configured to pivot the at least one of the supporting legs between a driving position lying against the carrying structure and a supporting position protruding from the carrying structure.

20. A method for operating a drivable working machine having a carrying structure with a boom rotatable thereon via a slewing gear, a plurality of supporting legs, and a compensator configured to compensate yaw oscillation of the carrying structure in a working position, the compensator having a sensing unit configured to sense the yaw oscillation, said method comprising: supporting the carrying structure in a working position with the plurality of supporting legs; rotating the boom about a vertical axis on the carrying structure using the slewing gear; using the compensator to compensate for yaw oscillation of the carrying structure; and sensing the yaw oscillation of the carrying structure by the sensing unit and using an actuator to produce a counter-torque on at least one of the supporting legs and thereby reducing the yaw oscillation.

21. The method according to claim 20, wherein the compensator comprises a controller having a feed-forward control system, the method further comprising using the feed-forward control system to sense a disturbance variable resulting from the actuation of the boom and/or a conveying pump, wherein the disturbance variables generated from the sensing unit are fed to an input of the controller.

22. The method according to claim 20, wherein the actuator has a hydraulic cylinder, the method further comprising using the hydraulic cylinder to horizontally pivot one of the supporting legs between a driving position and a supporting position.

23. A method for operating a drivable working machine having a carrying structure with a boom rotatable thereon via a slewing gear, a plurality of supporting legs, and a compensator configured to compensate yaw oscillation of the carrying structure in the working position, the compensator having a sensing unit configured to sense the yaw oscillation, said method comprising: supporting the carrying structure in a working position with the plurality of supporting legs; rotating the boom about a vertical axis on the carrying structure using the slewing gear; using the compensator to compensate for yaw oscillation of the carrying structure; providing the compensator with a controller having a feed-forward control system; and using the feed-forward control system to sense a disturbance variable resulting from the actuation of the boom and/or a conveying pump, wherein the disturbance variables generated from the sensing unit are fed to an input of the controller.

24. A method for operating a drivable working machine having a carrying structure with a boom rotatable thereon via a slewing gear, a plurality of supporting legs, and a compensator configured to compensate yaw oscillation of the carrying structure in the working position, the compensator having a sensing unit configured to sense the yaw oscillation, said method comprising: supporting the carrying structure in a working position with the plurality of supporting legs; rotating the boom about a vertical axis on the carrying structure using the slewing gear; using the compensator to compensate for yaw oscillation of the carrying structure; and providing the actuator with a hydraulic cylinder and using the hydraulic cylinder to horizontally pivot one of the supporting legs between a driving position and a supporting position.

\* \* \* \* \*